UNITED STATES PATENT OFFICE.

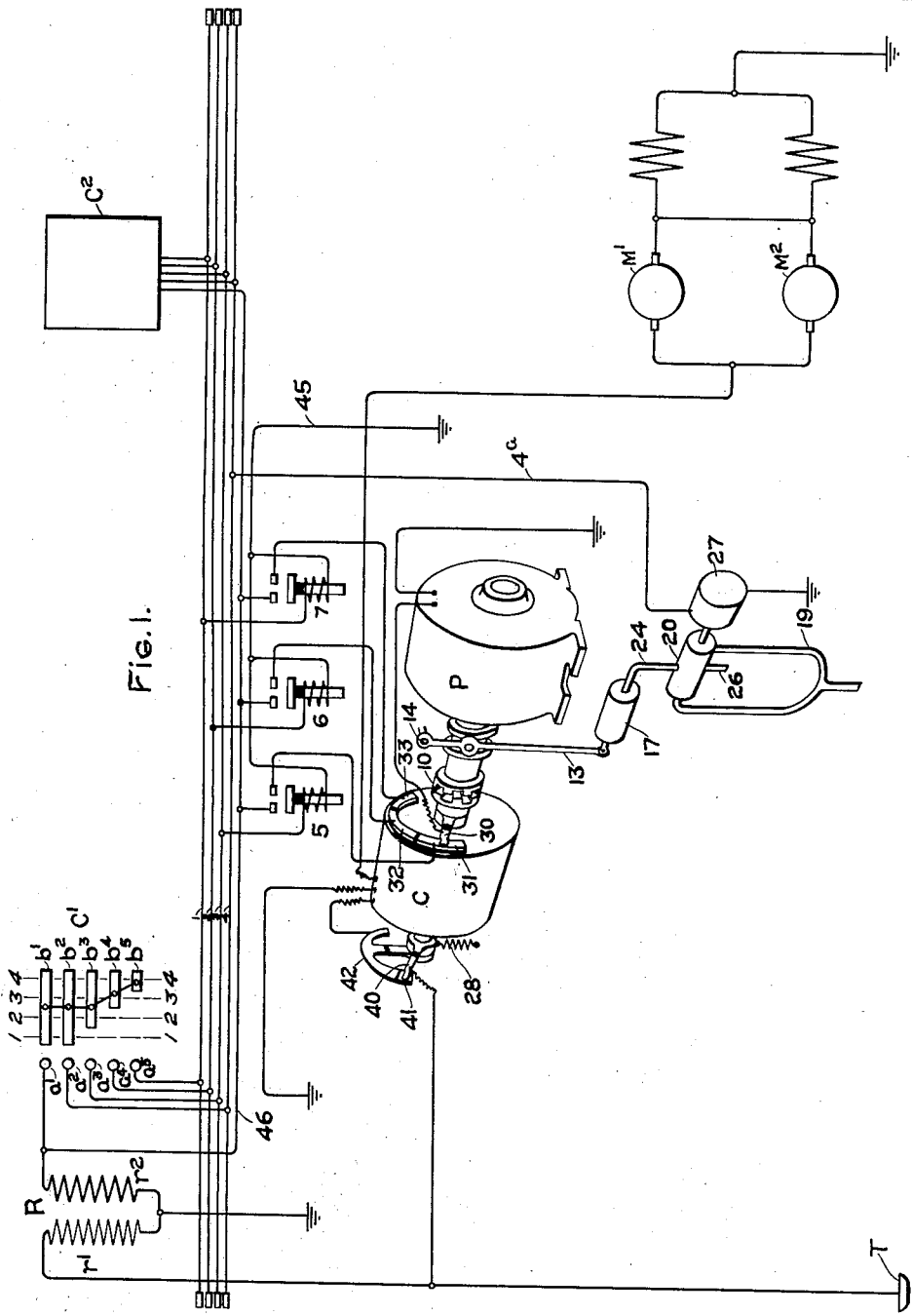

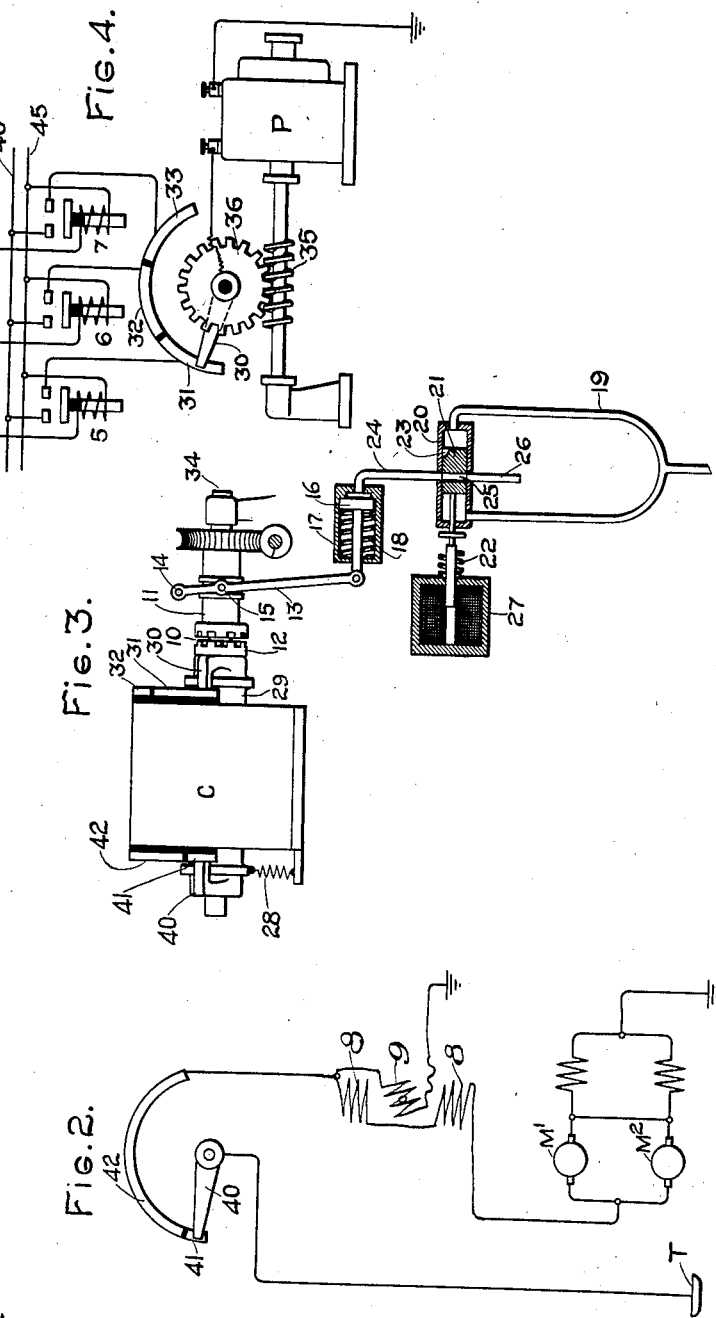

SIGVALD KROHN, OF BERLIN, GERMANY, ASSIGNOR TO GENERAL ELECTRIC COMPANY, A CORPORATION OF NEW YORK.

SYSTEM OF MOTOR CONTROL.

No. 822,282.  Specification of Letters Patent.  Patented June 5, 1906.

Application filed January 25, 1904. Serial No. 190,622.

*To all whom it may concern:*

Be it known that I, SIGVALD KROHN, a subject of the King of Sweden and Norway, residing at Berlin, Germany, have invented certain new and useful Improvements in Systems of Motor Control, of which the following is a specification.

The present invention relates to systems of motor control, more particularly to systems of control for motors operating on an alternating-current system and employed to propel a plurality of vehicles coupled together to form a train.

One of the objects of my invention is to control a plurality of motors located on the several cars of a train from any desired point on the cars or train in a simple and efficient manner; but it will be understood that the application of my invention is not limited to systems of train control.

A more specific object of my invention is to control a plurality of alternating-current motors in such a manner as to produce an approximately uniform torque. To accomplish this end, I provide an induction regulator or regulators for the motors, means for operating the regulators, means for disengaging the regulator from the operating means, and a master controlling device for said operating means.

The invention furthermore comprises means, such as a pilot motor or motors, which operate the propelling-motor-controlling device or devices through clutching means, preferably operated by compressed fluid, the said pilot-motors being connected to said master controlling device in such a manner that a synchronous step-by-step movement of the propelling-motor-controlling devices is obtained.

My invention also consists of a motor-control system comprising one or more alternating-current motors, a regulator for the same, which is operated by a pilot-motor the working circuit of which is closed, preferably, through a relay, by the operation of a master-controller and is opened by a contact device operating with the regulator after said regulator has turned about a certain angle.

In the accompanying drawings, which illustrate the preferred embodiment of my invention, Figure 1 represents diagrammatically the equipment of a single car in the train-control system operated by alternating current. Fig. 2 illustrates diagrammatically the electrical connections through the induction-regulator and the propelling-motors. Fig. 3 is a diagrammatic sectional elevation of the induction-regulator-operating mechanism. Fig. 4 represents the pilot-motor and part of the controlling mechanism therefor, and Fig. 5 represents diagrammatically a train of cars equipped with my invention.

Referring now to Fig. 1, the train-conductors of the control system are indicated by 1, 2, 3, and 4. These train-conductors are connected to the master controlling devices $C'$ and $C^2$ and are connected to the actuating-coils of the relays 5, 6, and 7, which control the connections of the working circuit of the pilot-motor P, operating the motor-controller or induction-regulator C. The pilot-motor, as shown, is of the rotary type; but it may of course be of any desired construction. The controller or regulator C controls the supply of current to the car-motors $M'$ and $M^2$. In the system herein illustrated the induction-regulator is operated to vary the potential impressed upon the terminals of the car-motors and comprises relatively fixed and movable windings, such as 8 and 9, respectively, one of which is connected in series with and the other in shunt to the motors, as shown diagrammatically in Fig. 2. One of these coils is adapted to be moved relative to the other, so as to vary the potential of the current supplied to the motors, and is moved through its successive operative positions by means of the pilot-motor P. This induction-regulator may have any desired construction—such, for instance, as that shown and described in the patent to Steinmetz and Armstrong, No. 542,968, granted July 16, 1895.

The pilot-motor is normally disconnected from the controller or induction-regulator; but it is adapted to be connected thereto by means of the clutch 10, the movable member 11 of which is adapted to be moved into engagement with the fixed member 12 by means of the pneumatically-actuated electromagnetically-controlled mechanism, more clearly illustrated in Fig. 3. The lever 13, which is pivoted at a relatively fixed point 14, engages the movable member 11 at 15 and is connected to the piston 16, operating in the cylinder 17. The piston 16 is normally maintained at the right-hand end of the cylinder 17 by means of the spring 18, thereby normally maintaining the clutch 10 in its open position. By the admission of compressed fluid from a suitable source of supply (which may, if desired, be the source of supply for an air-brake system) through the pipe 19 into the right-hand end of the cylinder 20 the valve 21 contained therein is moved to the left against the action of a spring 22, thereby bringing the passage-way 23 into register with the pipe 24 and allowing the compressed fluid to enter the cylinder 17. The valve 21 has also formed therein a passage-way 25, which is adapted to register with the pipe 24 and the exhaust-port 26 when the valve is in its normal position to exhaust cylinder 17. The valve 21 is operated by the electromagnet 27 in a manner to be herein described. An electromagnet or other clutching or connecting means may be substituted for the device herein shown, if it is desired to do so. A spring 28 is provided for the purpose of retaining the induction regulator or controller to its initial position whenever the connecting means is released.

Mounted on one end of the sleeve 29, carrying the movable winding of the induction-regulator, is the contact-arm 30, which engages the contact-segments 31, 32, and 33, which are connected in circuit with the pilot-motor P and are also connected to the source of supply through the contacts of the relays 5, 6, and 7, respectively. By this arrangement it will be seen that the working circuit of the pilot-motor is automatically opened at three different points after being closed by the relays, thereby controlling the operation of the pilot-motor P in a step-by-step manner. Of course any desired number of steps may be employed, necessitating a change in the number of contacts and relays. In Figs. 3 and 4 the pilot-motor is connected by means of the worm-and-wheel mechanism 35 and 36 to the operating-shaft 34, on which the movable member of the clutch is splined and the sleeve 29 is loosely mounted. Mounted on the sleeve 29 of the induction-regulator at its opposite end is a contact-arm 40, which engages with the contact-segments 41 and 42, thereby forming a switch which controls the circuit leading from the source of supply or trolley T to the induction-regulator. The current for operating the control system is supplied from the main source of supply through the transformer R, the primary winding $r'$ of which is connected directly across the line and the secondary $r^2$ of which is connected to the control-circuits. One of the master-controllers—namely, the controller C'—is shown in development, as is customary in illustrating such a structure, and comprises the relatively fixed contact-fingers $a'$ to $a^5$, inclusive, and the relatively movable contact-segments $b'$ to $b^5$, inclusive. In Fig. 5 I have shown the preferred relative location of the master and motor controlling devices on the cars of a train.

In the operation of the alternating-current system herein described when the master-controller is moved into its first operative position (indicated by 1 1) a circuit is completed from the secondary of the transformer R through the contact-finger $a'$, contact-segments $b'$ and $b^2$, contact-finger $a^2$, train-conductor 4, and from thence through the conductor $4^a$ and the actuating-coil of the magnet 27 to ground. The energization of the magnet 27 causes the valve 21 to be operated to admit compressed fluid from a suitable source of supply through the pipes 19 and 24 into the cylinder 17, thereby moving the piston 16 and operating the clutch 10, which connects the alternating-current pilot-motor P to the controller or induction-regulator C. A movement of the master-controller into its second operative position (indicated by 2 2) completes a control-circuit from the contact-finger $a'$ through contact-segments $b'$ and $b^3$, train-wire 3, actuating-coil of the relay 5, through the conductor 45 to ground. The relay 5 is thereby closed, and a circuit is completed from the secondary to the transformer R through the conductor 46, contacts of the relay 5, contact-segment 31, contact-arm 30, through the pilot-motor P to ground. The pilot-motor is then started and rotates the movable member of the induction-regulator. The circuit through the induction-regulator is controlled by the switch of which the contact-arm 40 forms a part, and this contact-arm is moved out of engagement with the contact-segment 41 and into engagement with the contact-segment 42 when the pilot-motor first begins to operate. A circuit through the controlled motors is thereby completed as follows: from the trolley or collector-shoe T, through the contact-arm 40, contact-segment 42, through the winding 9 of the induction-regulator in shunt to the car-motors to ground, and also through the winding 8 of the induction-regulator, through the motors M' and M² to ground. These circuits are more clearly shown in Fig. 2. The pilot-motor continues to rotate so long as the contact-arm 30 is in engagement with the contact-segment 31, and the current supplied to said pilot-motor is cut off as soon as the arm leaves said contact-segment. The motor is thereby stopped automatically and cannot continue to rotate to increase the potential supplied to the motors of the car until the master controlling device has been moved into its next or a subsequent operative position. Upon moving the master-controller into its third operative position (indicated by 3 3) the train-wire 2 is energized and the relay 6 is operated, thereby completing a circuit from the conductor 46 through the contacts of the relay 6, contact-segment 32, contact-arm 30, through the pilot-motor P to ground. The pilot-motor thereby starts up again and continues to operate so long as the contact-arm 30 remains in engagement with the contact-segment 32 and is stopped when it moves out of such engagement. A movement of the master-controller into its final position (indicated by 4 4) energizes the train-wire 1 and causes the operation of the relay 7, which in turn completes the pilot-motor circuit through the contact-segment 33, thereby starting the pilot-motor again and allowing it to continue to move until it reaches its final position. It will thus be seen that the voltage or pressure impressed upon the motors M' and M² is gradually increased by the movements of the movable winding of the induction-regulator relative to its fixed winding and that the speed of the motors will be gradually increased up to the desired amount. When starting, the master controlling device may be immediately moved into the desired position, and the controlling mechanism will operate automatically and in the proper order. The cutting out is accomplished by rapidly turning the master controlling device back to its initial or "off" position, thereby deënergizing the magnet 27 and allowing the spring 18 to move the clutch mechanism 10 into its open position. The induction-regulator is then returned to its initial position by means of the spring 28. If, however, when cutting out we desire to pass a lower voltage or pressure, it is necessary first to cut out altogether and then again put the master controlling device into the desired position.

Instead of breaking the circuit for the pilot-motor at the contact-segments 31, 32, and 33 the separate relays may in the corresponding positions of the arm 30 be short-circuited, thereby deënergizing said relays and breaking the circuit for the pilot-motor at the contacts of the relays.

In multiphase railways it will generally be advisable to use but one phase for the controlling-circuit. The pilor-motor may be constructed as a repulsion-motor or a series motor, as desired. In the drawings the driving-motors are illustrated as series motors, though single-phase motors of any type may be employed with or without transformers.

Although in its main aspect my invention consists of a novel control system for single or multiphase alternating-current motors, it is evident that certain of its features may be employed in any system of motor control.

What I claim as new, and desire to secure by Letters Patent of the United States, is—

1. In a system of motor control, a motor or motors, a controller therefor, a pilot-motor for operating said controller, and pneumatically-operated means for connecting said pilot-motor to said controller.

2. In a system of motor control, a motor or motors, a controller therefor, a pilot-motor for operating said controller, pneumatically-operated means for connecting said pilot-motor to said controller, and electromagnetically-actuated means for controlling said pneumatically-operated connecting mechanism.

3. In a system of motor control, a motor or motors, a controller therefor, a pilot-motor for operating said controller, pneumatically-operated means for connecting said pilot-motor to said controller, electromagnetically-actuated means for controlling said pneumatically-operated connecting mechanism, and a master controlling device for said pilot-motor and connecting mechanism.

4. In combination, an induction-regulator, a switch for controlling the supply of current to said induction-regulator, a pilot-motor for operating said regulator and switch, and a master controlling device for said pilot-motor.

5. In combination, an induction-regulator, a switch for controlling the supply of current to said induction-regulator, a pilot-motor for operating said regulator and switch, a master controlling device for said pilot-motor, and means for connecting and disconnecting said pilot-motor and said induction-regulator and switch.

6. In combination, an induction-regulator, a pilot-motor therefor, coupling means operatively connecting said pilot-motor to said regulator, a master controlling device for said pilot-motor and coupling means, and means for returning said induction-regulator to its initial position as soon as the coupling means is released.

7. In a system of train control, a plurality of propelling-motors, controlling means therefor, operating means for said controlling means, fluid-pressure-actuated clutching devices, and means for producing a step-by-step movement of the propelling-motor-controlling means.

8. In a system of train control, a plurality of alternating-current propelling-motors on each car, an induction-regulator on each car adapted to vary the voltage impressed on the motor-circuit, means controllable from a distance for operating said induction-regulator, means controllable from a distance for releasing said induction-regulator from said operating means, means for returning said induction-regulator to a predetermined position when released, and a control system extending through the train and operatively connected to said operating and said releasing means.

9. In a system of train control, a plurality of alternating-current propelling-motors on each car, an induction-regulator on each car adapted to vary the voltage impressed on the motor-circuit, operating means for said induction-regulator, a valve governing the operation of said induction-regulator, a magnet-winding controlling said valve, and a control system extending through the train and connected to said magnet-winding.

In witness whereof I have hereunto set my hand this 14th day of December, 1903.

SIGVALD KROHN.

Witnesses:
 WOLDEMAR HAUPT,
 HENRY HASPER.